UNITED STATES PATENT OFFICE.

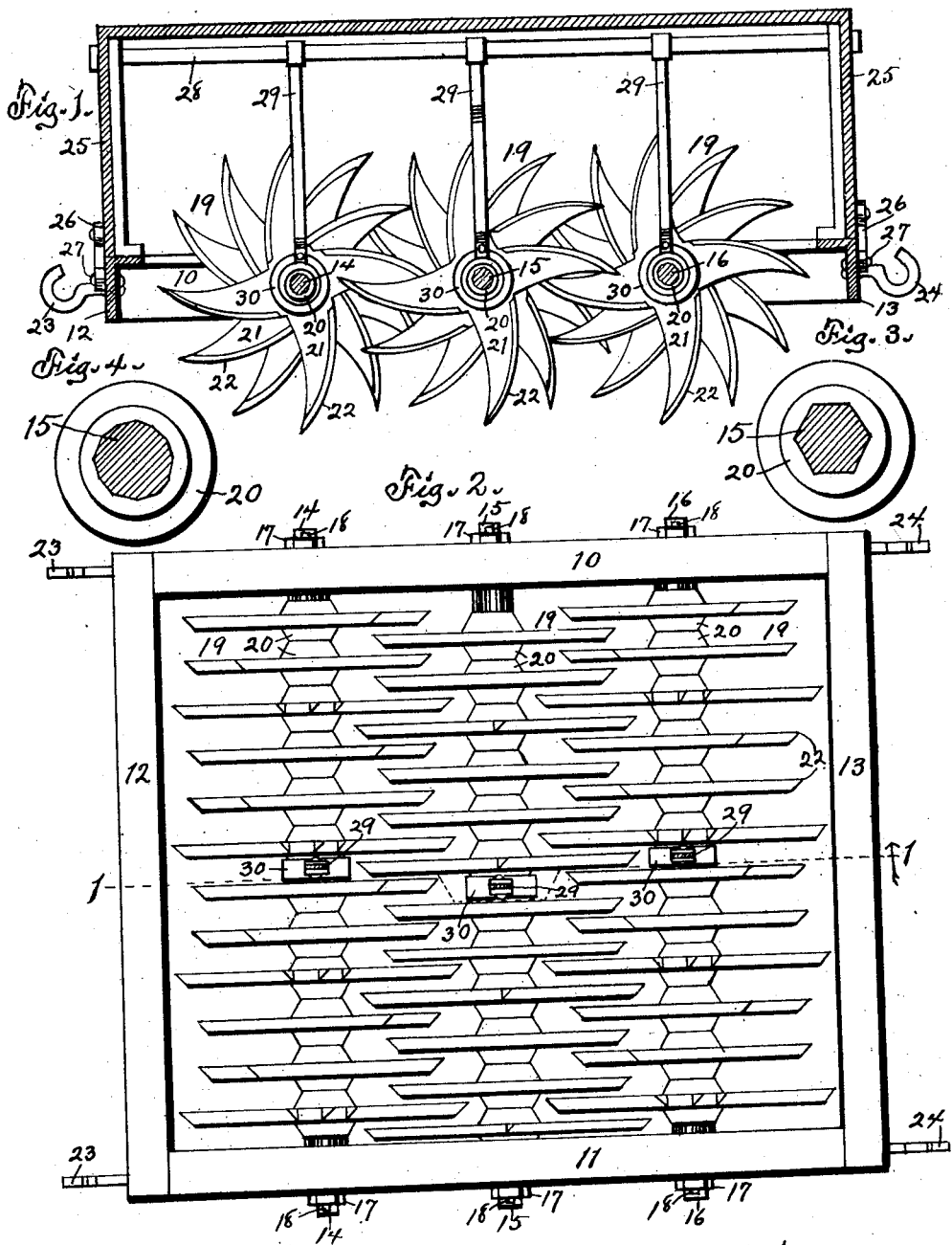

OLE A. OLSON, OF NORTHWOOD, IOWA.

REVOLVING TOOTHED-DISK HARROW.

1,405,860.  Specification of Letters Patent.  Patented Feb. 7, 1922.

Application filed July 28, 1919. Serial No. 313,767.

*To all whom it may concern:*

Be it known that I, OLE A. OLSON, a citizen of the United States of America, and resident of Northwood, Worth County, Iowa, have invented a new and useful Revolving Toothed-Disk Harrow, of which the following is a specification.

The object of this invention is to provide an improved construction of a harrow adapted for travel in opposite directions and susceptible of producing different results dependent on the direction of its travel.

A further object of this invention is to produce an improved toothed disk for harrows.

A further object of this invention is to provide improved means for mounting and connecting a plurality of toothed disks in staggered relations in respect of the teeth thereof.

A further object of this invention is to provide improved means for arranging several series of toothed disks in staggered relations, the disks in each series being in staggered relation to each other.

A further object of this invention is to provide improved means for bracing the supporting shaft and a disk harrow.

A further object of this invention is to provide a cover for a toothed-disk harrow.

My invention consists in the construction, arrangement and combination of elements hereinafter set forth, pointed out in the claims and illustrated by the accompanying drawing, in which—

Figure 1 is a longitudinal vertical section on the indicated line 1—1 of Figure 2. Figure 2 is a plan of the apparatus. Figure 3 is a cross-section, on an enlarged scale, showing the means employed to stagger the disks on a support. Figure 4 is a cross-section, on an enlarged scale, showing different means for staggering the disks on a support.

In the construction of the apparatus as shown the numerals 10, 11 designate the side members and 12, 13 the end members of a rectangular frame preferably made of angle bars and connected in any suitable manner. A plurality of shafts, in this instance three in number, 14, 15 and 16 are arranged transversely of the frame, parallel with each other and spaced apart. Each shaft is angular in cross-section except in its end portions, and the specific shape thereof may vary. For instance, in Figure 3 a six-sided shaft is shown, whereas in Figure 4 the shaft is shown as having twelve sides. The end portions of the shaft are circular in cross-section and are journaled in the upright flange or web of the side members 10, 11 of the frame. Projecting ends of each shaft are threaded to receive nuts 17 adapted to bear against the side members 10, 11 of the frame and limit endwise movement of the shaft, and cotter-pins 18 may be employed to hold the nuts on the shaft. A plurality of toothed disks 19 are mounted on each shaft and the disks on any one shaft are in staggered relation to and overlap the disks on an adjacent shaft. Each disk 19 is formed with a hub 20, preferably made integral therewith by molding and each hub is formed with a central bore angular in cross-section and fitting and non-rotatable relative to the shaft on which it is mounted. Thus the disks are adapted to be mounted with their teeth in staggered relation throughout the length of the angular portion of each shaft, being advanced in series one unit of angularity circumferentially of the shaft. Each disk is formed with a plurality of teeth, in this instance four in number, 21 and said teeth are scimeter-shaped, being formed with convex and concaved margins and pointed. Each convex margin is beveled and sharpened to produce a cutting edge 22 and each concaved margin is straight in cross-section and forms right angles with the side faces of the tooth. Connecting means, such as hooks 23, 24 are mounted on the end members 12, 13 of the frame and are adapted to be engaged respectively by draft means, not shown. A cover 25 formed as an inverted box, is mounted on the frame and may be secured thereto in any suitable manner, such as by hooks 26 and pins 27 in interengaging relation. A bar 28 is mounted in and longitudinally and centrally of the upper portion of the cover 25 and braces 29, in this instance three in number, connect said bar at intervals to collars 30 mounted in embracing and pivotal relation on hubs 20. It is the function of the collars, braces and bar to stiffen and strengthen the shafts 14, 15 and 16 against upward pressure occasioned by engagement of the disks with the earth.

In practical use, the apparatus or implement is drawn over the surface of the earth in either direction by draft means attached to the hooks 23, 24. When the implement advances toward the left in the drawing, the cutting edges 22 engage and cut the soil, making slits in the surface thereof cutting, dividing and comminuting clods, cornstalks and other objects encountered thereby and operating generally on the surface in the manner common to disk harrows, with the additions in function and operation related to the staggered relation of the teeth of parallel disks on a given shaft, the staggered relation of the disks on adjacent shafts, and the overlapping relation of disks on adjacent shafts. When the implement advances in the opposite direction, as toward the right in the drawing, the teeth engage the soil with spading effect and function, the hooked form of the teeth and the staggered relation of the teeth on the disks carried by a given shaft, tending to tear up, disturb and cultivate the soil to a considerable depth.

The cover 25 serves to protect the user from contact with the disks during the use of the implement and any suitable seat may be provided for the user on said cover.

I do not desire to be limited to the precise construction shown and described, as the same may be modified within the scope of the appended claims without departing from my invention.

I claim as my invention—

1. In a revolving toothed-disk harrow having a frame, shafts mounted for rotation in said frame, and means at each end of the frame for attaching draft means thereto whereby the direction of travel of the harrow may be reversed, toothed disks mounted on and non-rotatable relative to said shafts, the teeth of each disk being scimeter-shaped and sharpened on their convex margins so that in reversing the direction of travel of the harrow the cutting and spading functions of the teeth may be alternately applied to soil.

2. In a revolving-disk harrow having a suitable frame, shafts mounted for rotation and partially suported in the sides of said frame, disks mounted on said shafts and formed with hubs, means for attaching draft devices to said frame and a cover removably and replaceably mounted on said frame, the combination with said shafts and cover of a bar mounted in said cover, collars loosely mounted on the hubs of some of said disks adjacent to the centers of said shafts and braces connecting said collar to said bar.

3. In a revolving toothed-disk harrow having a suitable frame and shafts mounted for rotation in said frame and means at each end of the frame for attaching draft means thereto whereby the direction of travel of the harrow may be reversed, the shafts being angular in cross-section between their pivots, toothed-disks non-rotatably mounted on said shafts, the non-rotatable mounting being attained by reason of angular holes formed in the disks fitting to the angular portions of the shafts, the teeth of adjacent disks on a given shaft being staggered through and by reason of rotatable adjustment of the disks thereon as contra-distinguished to a twisted shaft, the teeth of each disk being scimeter-shaped and sharpened on their convex margins so that in reversing the direction of travel of the harrow the cutting and spading functions of the teeth may be alternately applied to the soil, each disk being formed with integral hubs abutting longitudinally of the shafts, and means for clamping the hubs on each shaft together.

4. In a revolving toothed-disk harrow, a shaft adapted to be mounted for rotation and angular in cross-section between its pivots, toothed-disks each having all of its parts lying in the same plane, each disk being formed with an angular hole adapted to be mounted selectively and non-rotatably on said shaft, each disk being adapted for circumferential adjustment on said shaft, hubs integral with said disks and also slidingly and non-rotatably mounted, on said shaft for spacing said disks and means for clamping said hubs together longitudinally of said shaft.

Signed at Northwood, in the county of Worth and State of Iowa, this 2nd day of July, 1919.

OLE A. OLSON.